(12) United States Patent
Greco

(10) Patent No.: US 7,949,981 B2
(45) Date of Patent: May 24, 2011

(54) VIA DENSITY CHANGE TO IMPROVE WAFER SURFACE PLANARITY

(75) Inventor: Stephen E. Greco, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/183,313

(22) Filed: Jul. 31, 2008

(65) Prior Publication Data

US 2010/0031221 A1 Feb. 4, 2010

(51) Int. Cl.
*G06F 17/50* (2006.01)
*G06F 19/00* (2011.01)

(52) U.S. Cl. ............ 716/119; 716/51; 716/54; 716/126; 700/98; 700/121

(58) Field of Classification Search .................. 716/9, 10, 716/13, 14; 700/98, 121
See application file for complete search history.

(56) References Cited

U.S. PATENT DOCUMENTS

| | | | |
|---|---|---|---|
| 7,240,314 B1 * | 7/2007 | Leung | 716/8 |
| 7,565,638 B2 * | 7/2009 | Hoerold | 716/18 |
| 7,574,685 B1 * | 8/2009 | Dong et al. | 716/11 |
| 7,611,991 B2 * | 11/2009 | Richter et al. | 438/687 |
| 2003/0074098 A1 * | 4/2003 | Cheung et al. | 700/121 |
| 2005/0210435 A1 * | 9/2005 | Zorrilla et al. | 716/12 |
| 2006/0065981 A1 * | 3/2006 | Egusa | 257/774 |
| 2006/0190846 A1 * | 8/2006 | Hichri et al. | 716/1 |
| 2008/0120586 A1 * | 5/2008 | Hoerold | 716/9 |

OTHER PUBLICATIONS

Kahng et al., "DOE-Based Extraction of CMP, Active and Via Fill Impact on Capacitances," IEEE Transactions on Semiconductor Manufacturing, vol. 21, No. 1, Feb. 2008, pp. 22-32.
Matsui et al., "Focus Error Reduction by Photo-Resist Planarization in Via-First Dual Damascence Process," IEEE 0-7803-8752-X, 2005, pp. 162-164.

* cited by examiner

*Primary Examiner* — Phallaka Kik
(74) *Attorney, Agent, or Firm* — Katherine S. Brown; Hoffman Warnick LLC

(57) ABSTRACT

Changing a via density for viafill vias to improve wafer surface planarity for later photolithography is provided, in one embodiment, by obtaining a circuit design including a plurality of viafill vias having differing via density across the circuit design, each viafill via interconnecting non-functional metal fill shapes in different layers of the circuit design; selecting a region of the circuit design to evaluate using an evaluation window; determining a via density within the evaluation window; and changing a number of viafill vias within the region in the circuit design in response to the via density being different than a threshold via density that is selected such that a coating deposited over the plurality of vias presents a substantially planar surface.

20 Claims, 8 Drawing Sheets

US 7,949,981 B2

VIA DENSITY CHANGE TO IMPROVE WAFER SURFACE PLANARITY

BACKGROUND

1. Technical Field

The disclosure relates generally to integrated circuit (IC) chip design and fabrication, and more particularly, to changing of via density to improve wafer surface planarity.

2. Background Art

Fabrication of copper interconnects in today's integrated circuits usually involves "via first" dual damascene. Vias are first etched into a dielectric or dielectric stack, usually down to an etch stop layer. After resist strip, the line level processing is done, which first involves spin coating an underlayer material which fills the via holes, "planarizing" the surface. Subsequent layers are then deposited or spin coated, and line level lithography is then done. However, the degree to which the underlayer planarizes the wafer surface has been found to depend on the via density. As shown in FIG. 1, high via density areas "consume" more of the underlayer to fill the holes and this results in a wafer surface which, after underlayer coating, has height differences between high via density and low via density areas (other things being equal, since metal densities at prior levels also effect surface height).

The lithographic materials which are coated on top of the underlayer generally do not planarize over such large distances, and the result is that the distance from the surface of the photoresist layer to the lens of the exposure tool varies from place to place within the chip. The exposure tool reads the surface planarity prior to exposure and chooses a plane of best average focus (which is varied continuously as the exposure slit scans across the reticle field). A non-planar surface must, of course, have some areas which are in better focus than others, if a planar exposure is done across the slit surface. If, for instance, the majority of the slit area has a high density of vias, the line images over the low via density areas will be in particularly poor focus (other things being equal) and therefore will be more subject to scumming, poor critical dimension (CD) control and associated yield problems. The difference in the best focus setting conditions for imaging minimum dimension lines (45 nm technology node) over high density via areas versus low density via areas may be a significant portion of the depth of focus for today's critical lithography processes. Other effects, such as non-planarity due to chemical mechanical polish (CMP), and lithography tool control factors (lens distortions, chuck imperfections, etc.) also consume portions of the available depth of focus.

BRIEF SUMMARY

Changing a via density for viafill vias within a circuit design to improve wafer surface planarity for later photolithography is provided, in one embodiment, by obtaining a circuit design including a plurality of viafill vias having differing via density across the circuit design, each viafill via interconnecting non-functional metal fill shapes in different layers of the circuit design; selecting a region of the circuit design to evaluate using an evaluation window; determining a via density within the evaluation window; and changing a number of viafill vias within the region in the circuit design in response to the via density being different than a threshold via density that is selected such that a coating deposited over the plurality of vias presents a substantially planar surface.

A first aspect of the disclosure provides a method comprising: obtaining a circuit design including a plurality of viafill vias having differing via density across the circuit design, each viafill via interconnecting non-functional metal fill shapes in different layers of the circuit design; selecting a region of the circuit design to evaluate using an evaluation window; determining a via density within the evaluation window; and changing a number of viafill vias within the region in the circuit design in response to the via density being different than a threshold via density that is selected such that a coating deposited over the plurality of vias presents a substantially planar surface.

A second aspect of the disclosure provides a system comprising: at least one computing device; an obtainer for obtaining a circuit design including a plurality of viafill vias having differing via density across the circuit design, each viafill via interconnecting non-functional metal fill shapes in different layers of the circuit design; a selector for selecting a region of the circuit design to evaluate using an evaluation window; a determinator for determining a via density within the evaluation window; and a changer for changing a number of viafill vias within the region in the circuit design in response to the via density being different than a threshold via density that is selected such that a coating deposited over the plurality of vias presents a substantially planar surface.

A third aspect of the disclosure provides a program product stored on a computer-readable medium, which when executed by a computer system, performs a process comprising: obtaining a circuit design including a plurality of viafill vias having differing via density across the circuit design, each viafill via interconnecting non-functional metal fill shapes in different layers of the circuit design; selecting a region of the circuit design to evaluate using an evaluation window; determining a via density within the evaluation window; and changing a number of viafill vias within the region in the circuit design in response to the via density being different than a threshold via density that is selected such that a coating deposited over the plurality of vias presents a substantially planar surface.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
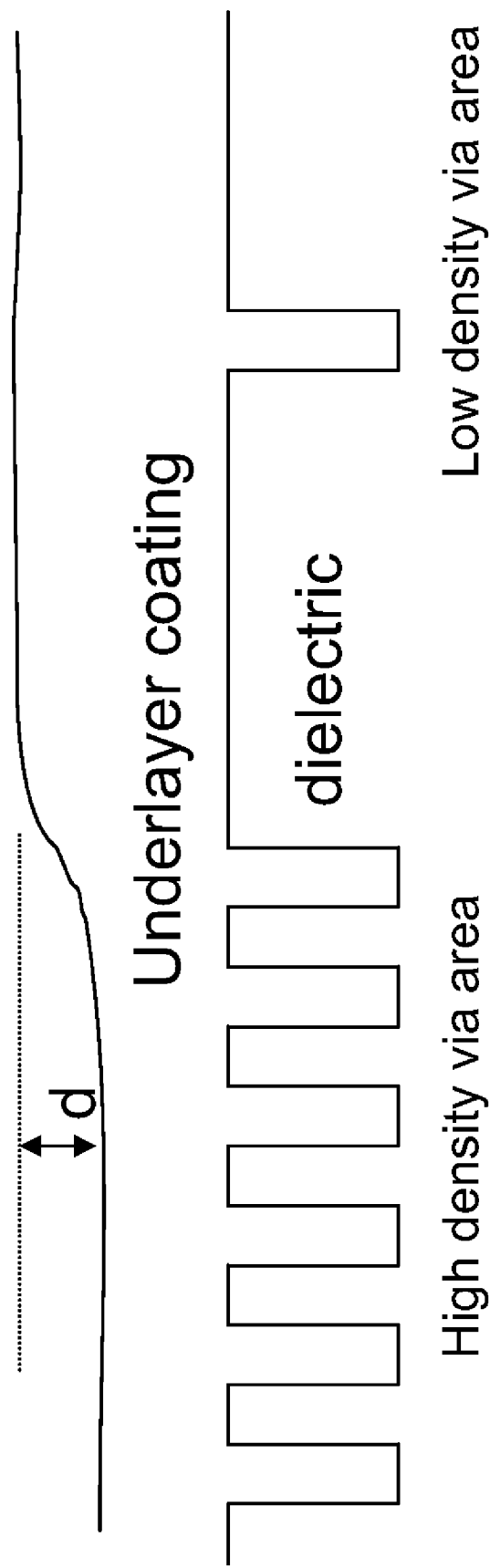
FIG. 1 shows a conventional coating over regions having different via densities.

As indicated above, the disclosure provides changing of via density for viafill vias within a circuit design to improve wafer surface planarity for later photolithography. In this manner, line level lithography processes over the via level may be presented with a more planar surface, thus allowing an increased process window.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
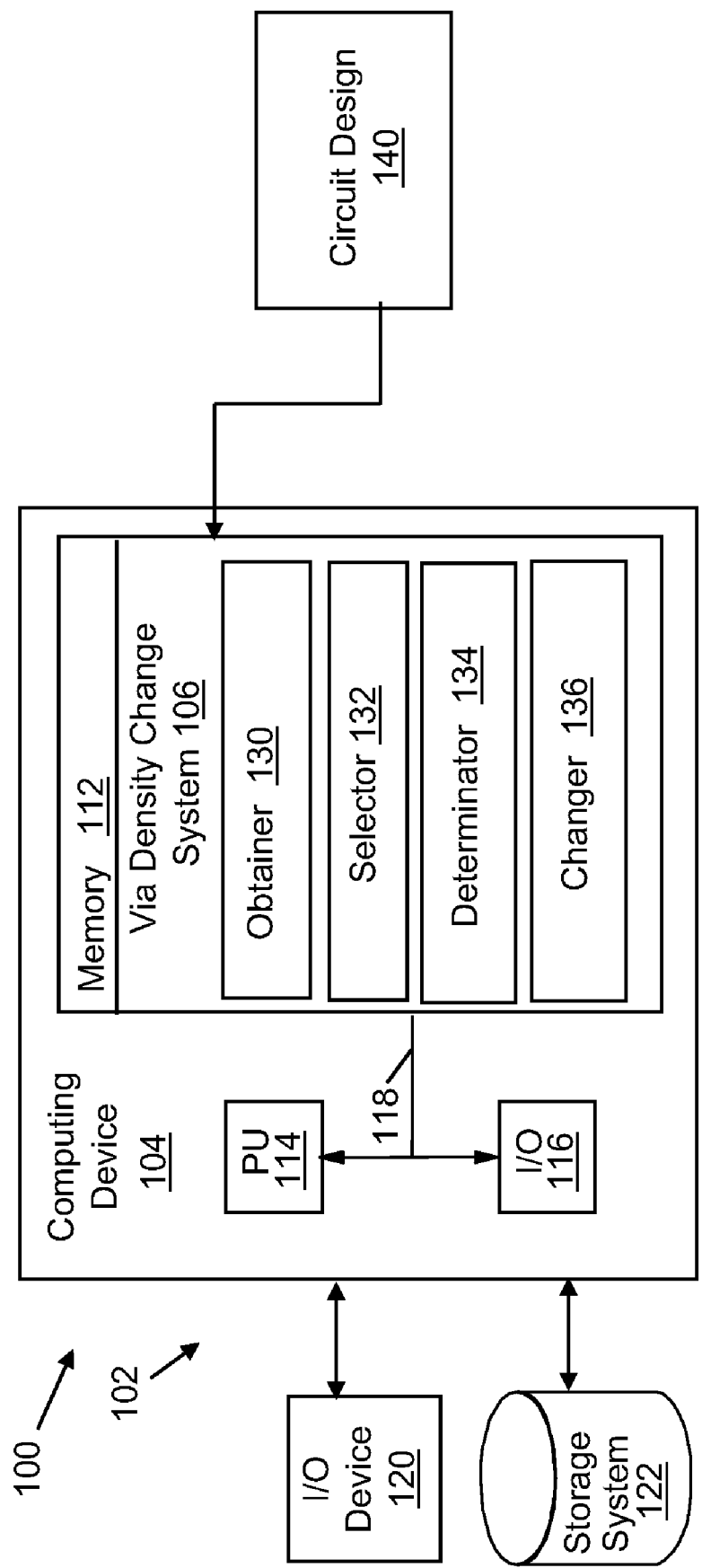
FIG. 2 shows a block diagram of a computer system according to the disclosure.

FIG. 2 shows an illustrative environment 100 for changing a via density for viafill vias within a circuit design to improve wafer surface planarity for later photolithography. To this extent, environment 100 includes a computer infrastructure 102 that can perform the various process steps described herein for changing via density for viafill vias. In particular, computer infrastructure 102 is shown including a computing device 104 that comprises a via density change system 106, which enables computing device 104 to performing the processes of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as via density change system 106, that is stored in memory 112 and/or storage system 122. While executing computer program code, processor 114 can read and/or write data, such as circuit design 140, to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and via density change system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Via density change system 106 may include an obtainer 130, a selector 132, a determinator 134 and a changer 136. Operation of each of these components is discussed further below. However, it is understood that some of the various systems shown in FIG. 2 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 3:
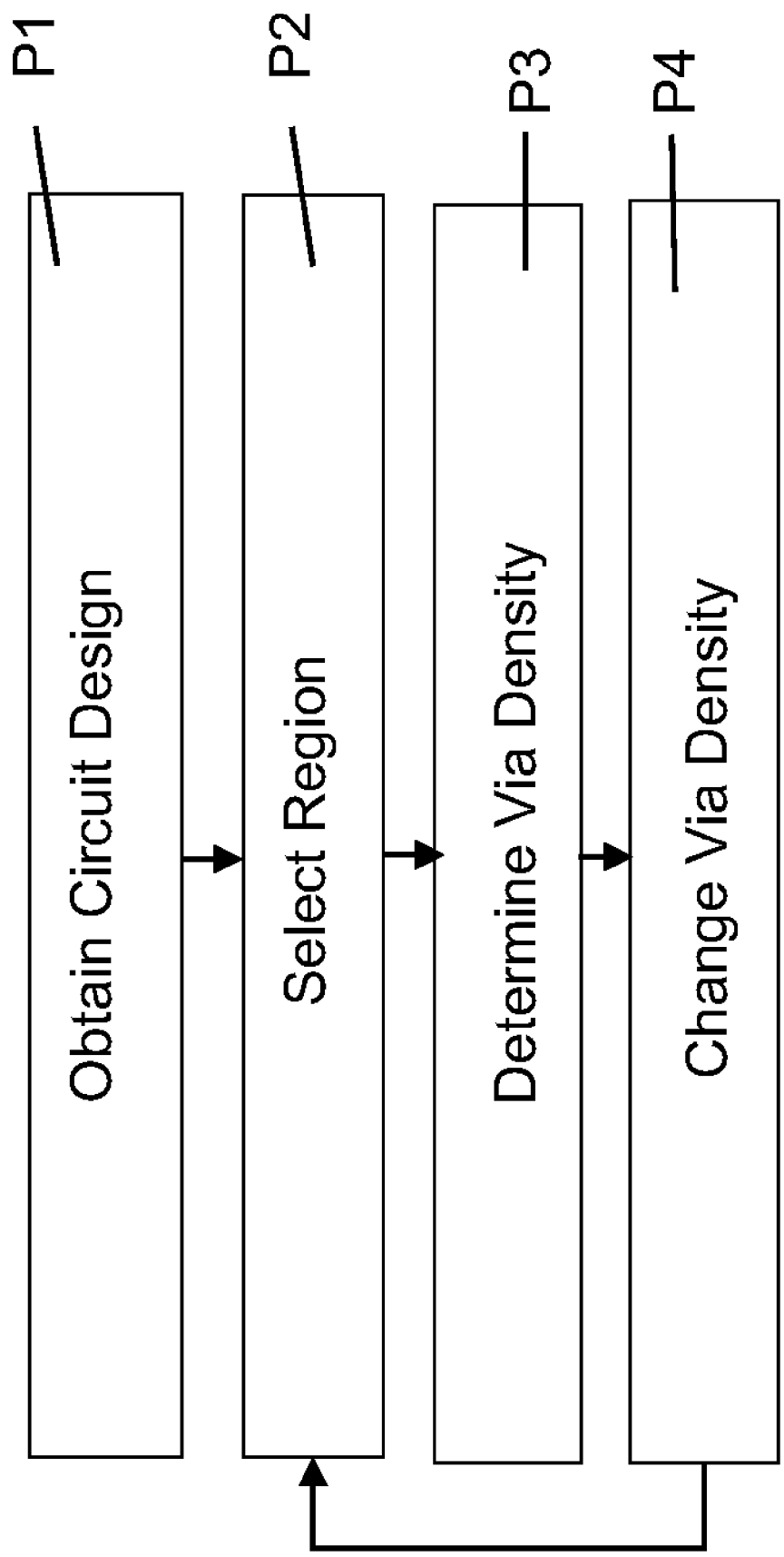
FIG. 3 shows a flow diagram of embodiments of a method according to the disclosure.
Figure 4:
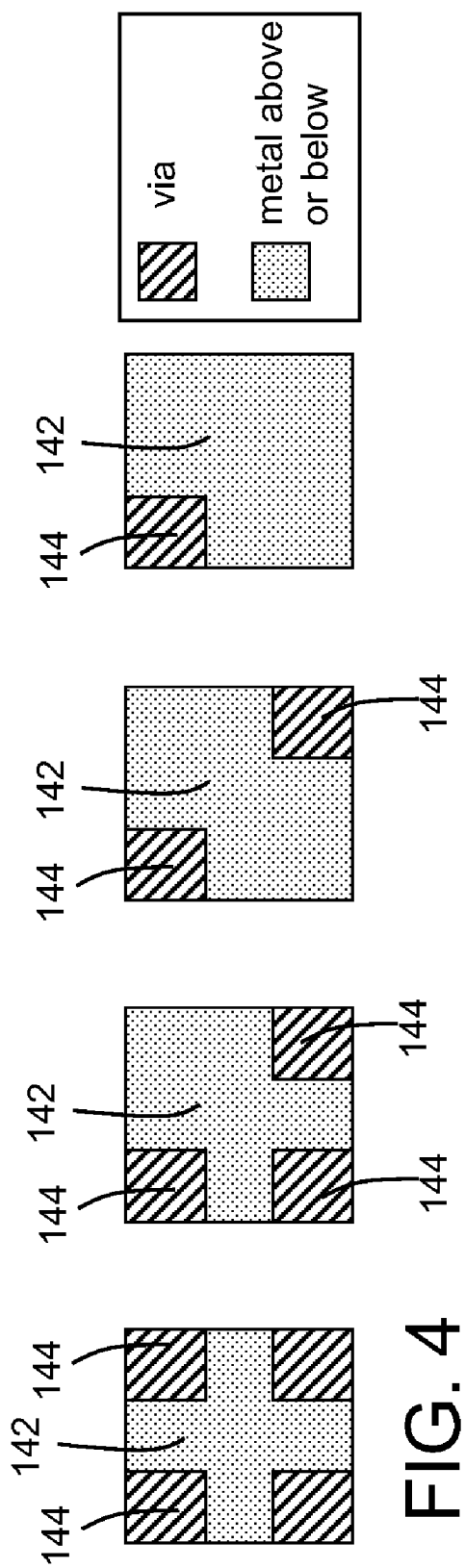
FIGS. 4-9 show various examples of changing of via density according to the disclosure.
Figure 5:
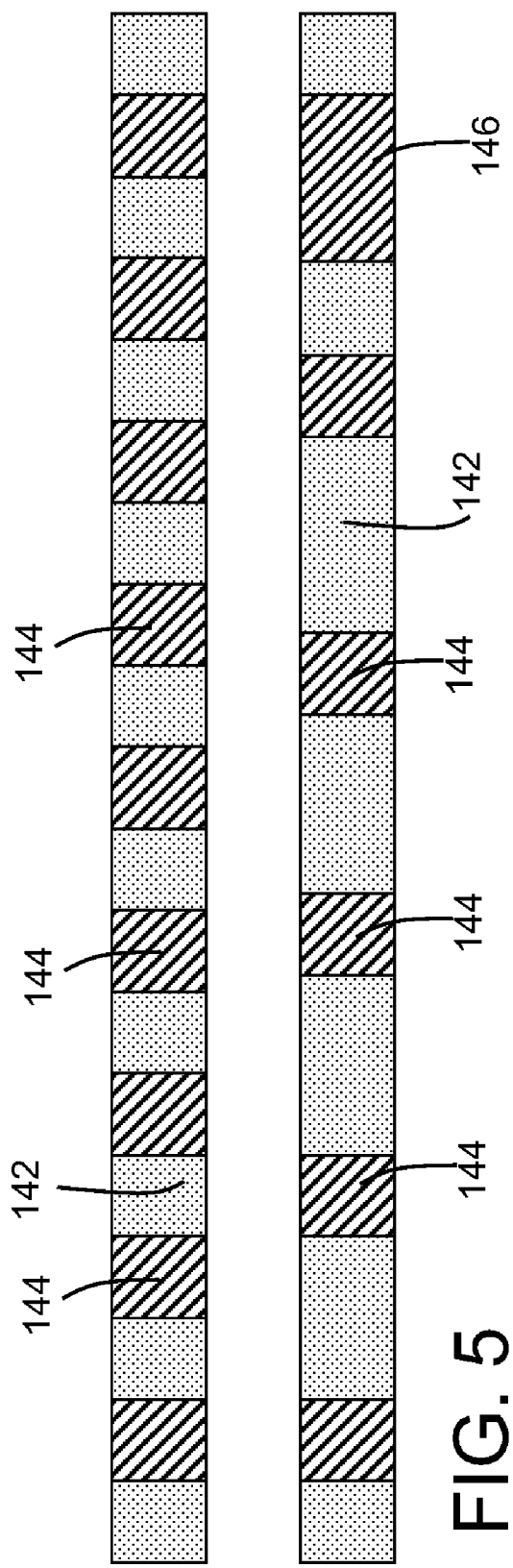

Turning to FIG. 3 in conjunction with FIG. 2 and FIGS. 4-9, embodiments of an operational methodology of via density change system 106 will now be described. In process P1, obtainer 130 obtains circuit design 140 including a plurality of viafill vias having differing via density across the circuit design (similar to that shown in FIG. 1). FIGS. 4-5 show examples of viafill vias 144 and non-functional metal fill shapes 142. As understood, each viafill via 144 interconnects non-functional metal fill shapes 142 in different layers of circuit design 140. The non-functional metal fill shapes 142 may be substantially rectangular shapes (FIG. 3) or wiring lines (FIG. 4). Viafill vias 144 is used currently to help increase mechanical integrity of insulator stacks. However, the viafill vias used are simply placed where they can fit according to the fill criteria, i.e., there is no consideration of any other factors. Viafill vias are almost always used in dicing channels and sometimes throughout the chip, although it may not be necessary for mechanical integrity in the chip because product functional vias may provide sufficient mechanical integrity.

In process P2, selector 132 selects a region of the circuit design to evaluate using an evaluation window 150 (FIGS. 6-9).

In process P3, determinator 134 determines a via density within the evaluation window.

In process P4, changer 136 changes a number of viafill vias within the region in the circuit design in response to the via density being different than a threshold via density that is selected such that a coating deposited over the plurality of vias presents a substantially planar surface. In one embodiment, changer 136 selects the threshold via density based on the coating deposited over the plurality of viafill vias. For example, changer 136 may select a threshold via density based on empirical data of how well a particular coating fills viafill vias having a particular via density. Alternatively, the data may be correlated such that the threshold via density can be calculated. Operation of changer 136 can be combined with existing intelligent metal fill algorithms (which predict, among other things, surface height after CMP) to provide a more complete solution to planarity problems which affect lithography. For example, in the case of incorporation of the invention with a CMP model, the algorithm may not necessarily strive for substantially uniform via density across a via level in deciding how many vias to put into an area. Rather, it may also consider underlying topography, as predicted by a CMP model. In this case, for example, if via lithography is anticipated over a low spot, the planarizing layer may be made thicker thereby lowering via density at that location.

Figure 6A:
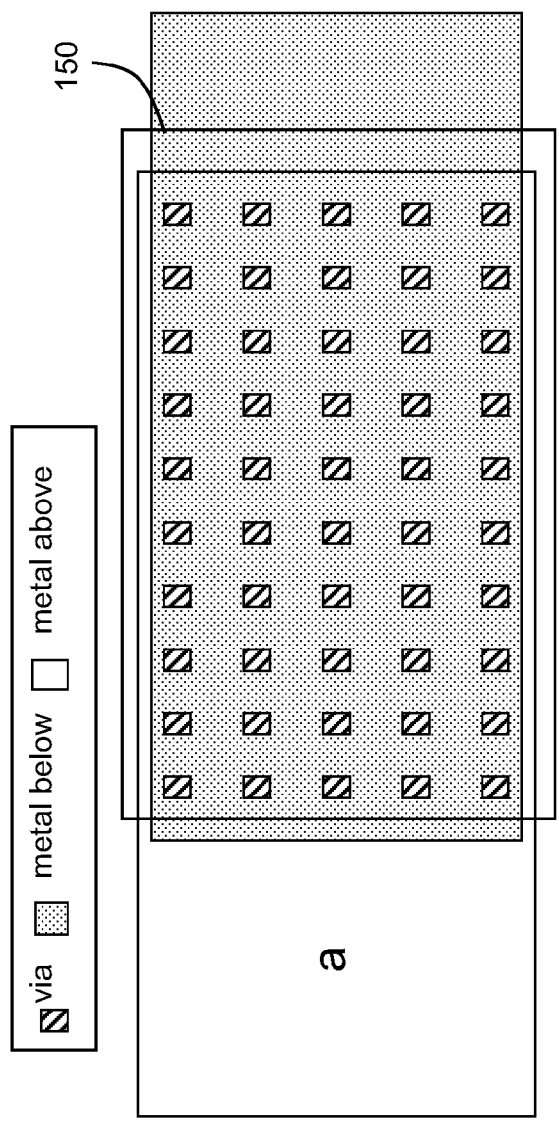
Figure 6B:
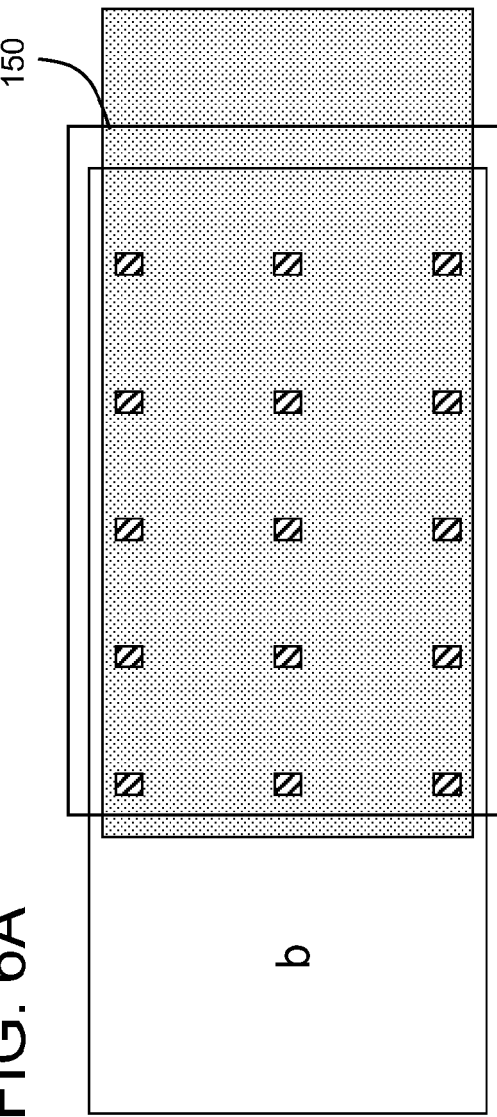

Changer 136 may adjust the number of viafill vias 144 based on a number of factors. In one embodiment, changer 136 increases the number of viafill vias 144 within the region in response to the via density being less than the threshold via density, and decreases the number of viafill vias within the region in response to the via density being greater than the threshold via density. FIG. 5 shows changing viafill via density by increasing the number of vias and FIGS. 6A-B show changing via density by decreasing the number of viafill vias. Of course, viafill vias between metal fill shapes can be added only if there is room within a circuit design to have coincident metal fill shapes on adjacent levels. In addition, non-functional (non-current carrying) vias 144 can be added over functional lines in areas where space permits (they do not have to be added at regular intervals). In this case, the vias could be added with or without metal shapes over them. It may also be possible to change the via density by changing the size of the vias within the region, i.e., without changing the number of vias. For example, as shown in FIG. 5 (lower right), an oversized via or viabar 146 (on functional metal shapes or on metal fill shapes) could be used to locally increase via "area". In one embodiment, changer 136 may adjust the number of viafill vias 144 to provide a substantially uniform average via density across a reticle field used to create a circuit based on circuit design 140. In another embodiment, changer 136 may adjust the number of viafill vias 144 to minimize gradients in via density between regions.

As shown in FIG. 3, the above-described processes P2-P4 may be repeated for a plurality of regions of circuit design 140. In this manner, the via density across all regions of circuit design 140 may be considered. Evaluation window 150 can be of various sizes, typically square or rectangular in shape, and the via density determination can be done by stepping evaluation window 150 in various increments, and then determining via density within the window using any now known or later developed technique. Changes can then be made in each region.

Figure 7:
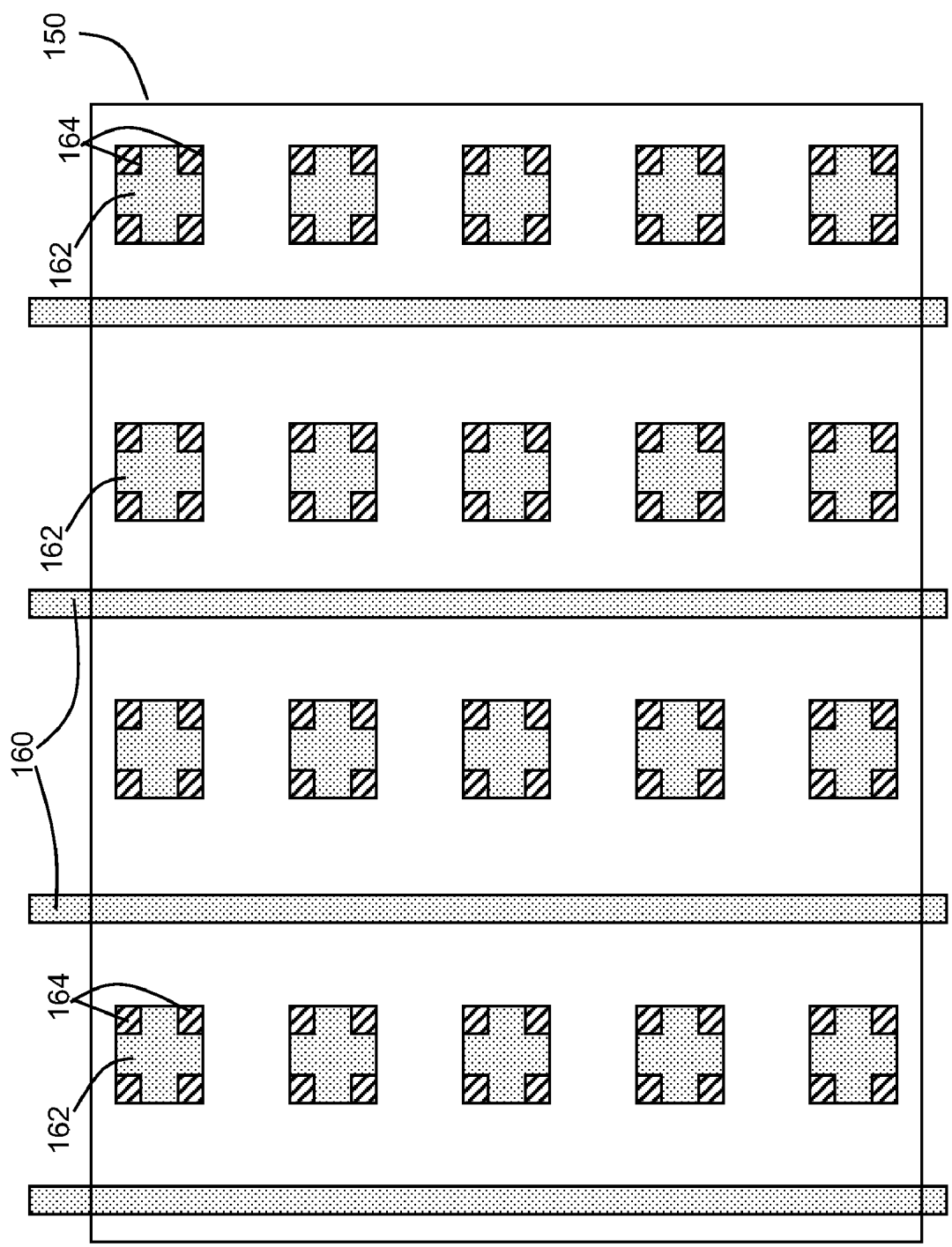
Figure 8:
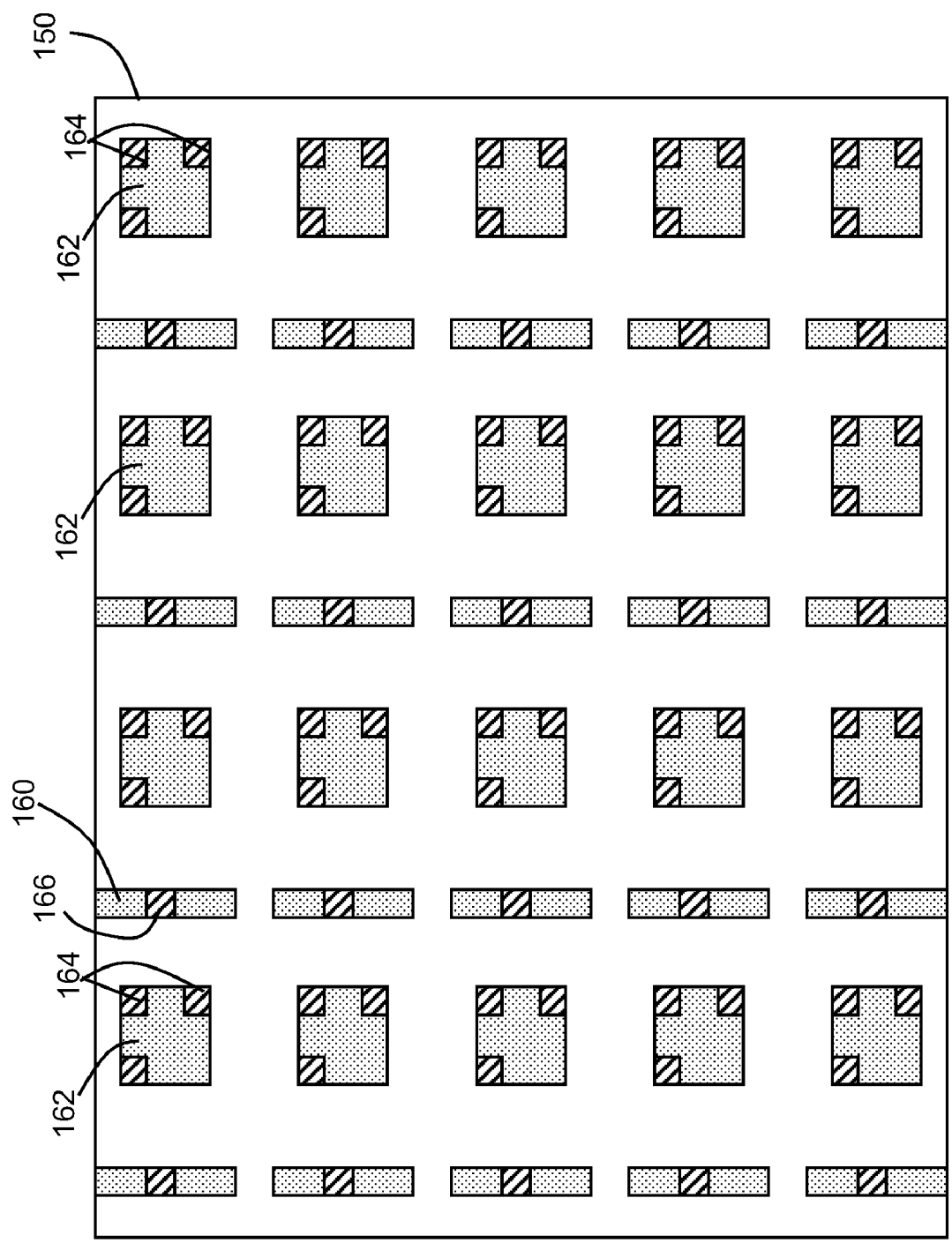
Figure 9:
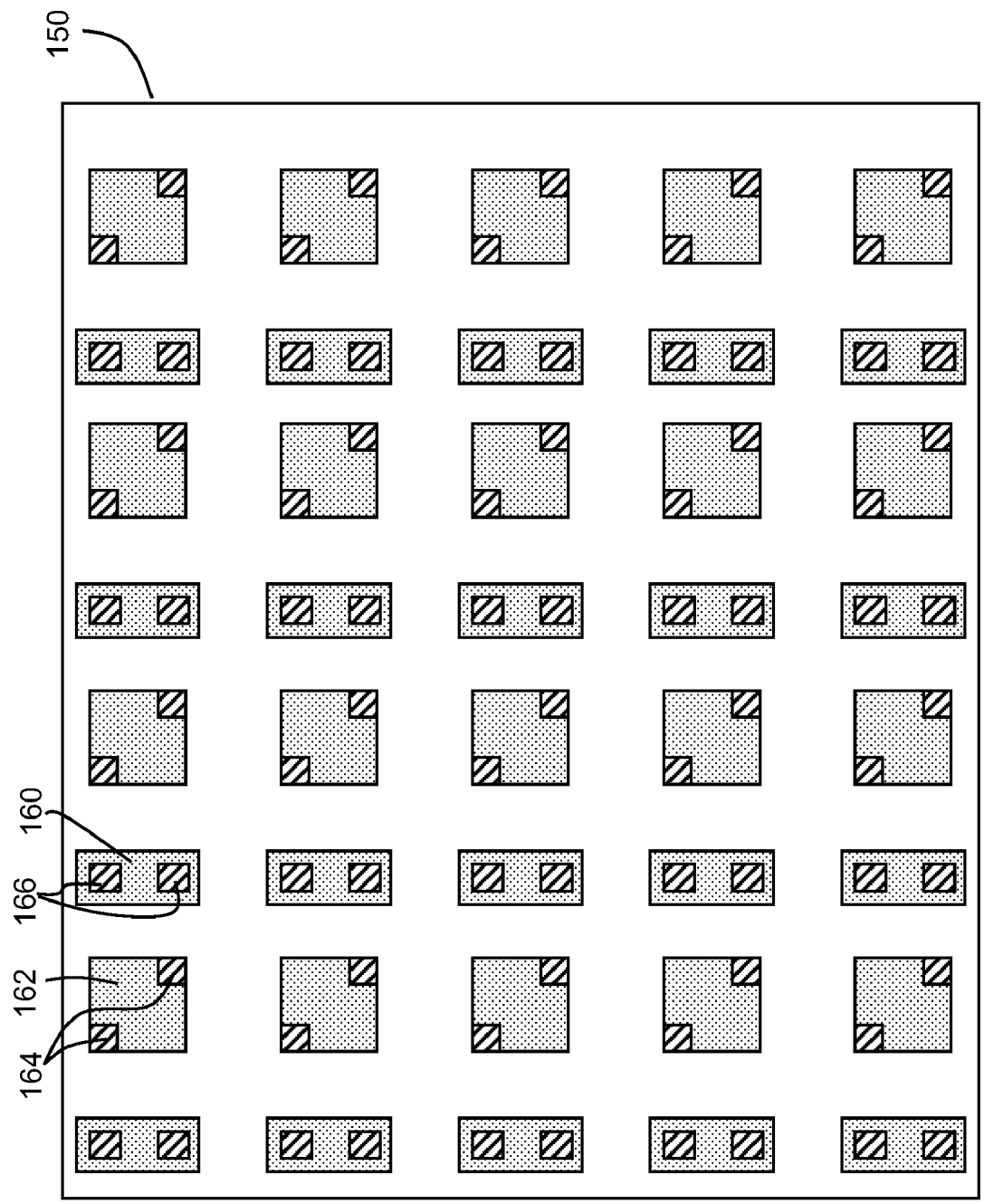

FIGS. 7-9 show examples of using viafill vias in accordance with the disclosure. FIG. 7 shows a region of a circuit design, i.e., within evaluation window 150. Vertical lines 160 are second metal (M2) wires which are part of a functional circuit. The squares are metal fill shapes 162, which are non-functional pieces of metal added to make metal density more uniform and therefore metal thickness more uniform. Fill shapes 162 in this case are at both the first (M1) and second metal levels (they are exactly on top of each other, so only the second metal M2 fill shape is shown in the FIG.). Viafill vias 164 connecting M1 and M2 are represented by the cross hatched squares. In FIG. 7, metal fill shapes 162 at M1 and M2 are therefore connected by four viafill vias 164 per M1 or M2 shape 164. In the particular area of the circuit shown in FIG. 7, there are no vias connecting to the functional pieces of metal 160. The via density within the area outlined by evaluation window 150 is therefore eighty vias per window, and is comprised only of viafill vias 164. In practice, the number of viafill vias 164 within a typical evaluation window 150 would be much greater than eighty and the box would be of much greater size than in FIG. 7. An approximate box size is inferred from FIG. 7 by comparing the box size to viafill via 164 size. A typical evaluation window might be, for example, a 100 micron by 100 micron square. A relatively small evaluation window and therefore a small number of vias is shown in this example for clarity.

FIG. 8 shows another area of the circuit design within the same chip or within the same reticle field as that of FIG. 7. It is seen in FIG. 8 that the functional M2 metal 160 is now in the shape of a series of small rectangles, with a functional V1 via 166 within each rectangle that makes a connection to M1 (M1 is not shown is this view). FIG. 8 also has a series of metal fill shapes 162 (M2 exactly over M1) as in FIG. 7. In addition, evaluation window 150 of the same dimensions as in FIG. 7 is shown around region of FIG. 8. Since there are now twenty functional vias 166 within the evaluation window in FIG. 8, the disclosure would call for only 60 viafill vias 164 to be used within the region, such that the total number of vias (comprising viafill vias 164 and functional vias 166) within window 150 is eighty, which is the same total number as in FIG. 7. In the case of FIG. 8, having three viafill vias 164 per metal fill shape 162 (instead of four as in FIG. 7) brings the total number of vias within the region to eighty. There are other solutions possible, for example, some metal fill shapes 162 could have four viafill vias 164 and others have one, but in general the solution which provides the most uniform via density even within a region is the most desirable.

FIG. 9 shows a third region of the circuit design within the same chip or reticle field as FIGS. 7 and 8. It is seen that in FIG. 9 the functional M2 metal 160 is in the shape of a series of small rectangles, of slightly different shape than the rectangles in FIG. 8, with two functional V1 vias 166 within each rectangle making connection to M1 (M1 is not shown is this view). FIG. 9 also has a series of metal fill shapes 162 (M2 exactly over M1) as in FIGS. 7 and 8. In addition, an evaluation window 150 of the same dimensions as in FIGS. 7 and 8 is shown around the region of FIG. 9. Since there are now forty functional vias 166 within the evaluation window 150 in FIG. 9, the disclosure calls for only forty via fill vias 164 to be used within the region, such that the total number of vias (comprising via fill vias 164 and functional vias 166) within the region is again eighty, as in FIGS. 7 and 9. Having two viafill vias 164 per M1 or M2 metal fill shape 162 brings the total number of vias within the region to eighty. Again, there are other solutions possible, for example, some metal fill shapes 162 could have four viafill vias 164 and others could have none, etc., but in general the solution which provides the most uniform via density even within a region is the most desirable.

FIGS. 7-9 depict a case where the via density within several evaluation windows 150 of equal size over different regions of a circuit design can be kept exactly constant by adjusting the number of viafill vias 164 placed between coincident metal fill shapes 162. In practice, many evaluation windows 150 could be used to check and correct a design for via density, and the numbers of viafill vias 164 within each evaluation window/region will typically be much greater than in this example, in part due to the fact that as a practical matter, much larger evaluation windows would normally be used.

It should be understood that the number of viafill vias 164 may not be adjustable by such means as described here to achieve exactly the same numbers of vias within each of the many regions of circuit design 140. In keeping within the scope of the disclosure, adjustments in via density would be made to bring the number of viafill vias 164 within the many regions as close to the same value as possible and in doing so the planarity of the coating, e.g., photoresist material, used for the line level (above the relevant via level) imaging process would be increased and the lithography process window would therefore be increased. It is also understood that evaluation windows 150 need not all have the same arrangement of metal fill shapes 162, as in the embodiments described here. When reduced to practice, the via density determination would be done by design analysis software which would check via density within the many evaluation windows and then place extra viafill vias or remove viafill vias where needed to keep via density as uniform as possible across the entire chip or reticle field. It is understood that if the software worked in such a way as to remove viafill vias which were already present, it would remove only viafill vias or other vias which would not adversely affect circuit functionality.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., circuit design, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the FIG. or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method comprising:
    obtaining a circuit design including a plurality of viafill vias, the circuit design having differing via density across the circuit design, wherein each viafill via interconnects non-functional metal fill shapes in different layers of the circuit design;
    selecting a region of the circuit design to evaluate using an evaluation window;
    determining a via density within the evaluation window;
    comparing the via density within the evaluation window with a threshold via density, the threshold via density being based upon a likelihood of a subsequent coating deposition resulting in a substantially planar surface; and
    decreasing, using at least one computing device, a number of viafill vias within the region in the circuit design, or modifying, using the at least one computing device, a shape of one of the plurality of viafill vias, the decreasing or the modifying being performed in response to the via density being different than the threshold via density.

2. The method of claim 1, wherein the decreasing of the number of viafill vias within the region is performed in response to the via density being greater than the threshold via density.

3. The computer-implemented method of claim 1, wherein the non-functional metal fill shapes include one of: substantially rectangular shapes and wiring lines.

4. The computer-implemented method of claim 1, wherein the decreasing of the number of viafill vias includes decreasing the number of viafill vias to provide a uniform average via density across a reticle field used to create a circuit based on the circuit design.

5. The computer-implemented method of claim 1, wherein the decreasing of the number of viafill vias includes decreasing the number of viafill vias to minimize gradients in via density between regions.

6. The computer-implemented method of claim 1, further comprising selecting the threshold via density based on a type of the coating deposited over the plurality of viafill vias.

7. The computer-implemented method of claim 1, further comprising repeating the selecting, determining, comparing and decreasing across a plurality of regions of the circuit design.

8. A system comprising:
    at least one computing device including:
        an obtainer for obtaining a circuit design including a plurality of viafill vias having differing via density across the circuit design, each viafill via interconnecting non-functional metal fill shapes in different layers of the circuit design;
        a selector for selecting a region of the circuit design to evaluate using an evaluation window;
        a determinator for determining a via density within the evaluation window; and
        a changer for performing the following:
            comparing the via density within the evaluation window with a threshold via density, the threshold via density being based upon a likelihood of a subsequent coating deposition resulting in a substantially planar surface; and
            decreasing a number of viafill vias within the region in the circuit design, or modifying a shape of one of the plurality of viafill vias, the decreasing or the modifying being performed in response to the via density being different than the threshold via density.

9. The system of claim 8, wherein the changer:
    decreases the number of viafill vias within the region in response to the via density being greater than the threshold via density.

10. The system of claim 8, wherein the non-functional metal fill shapes include one of: substantially rectangular shapes and wiring lines.

11. The system of claim 8, wherein the changer decreases the number of viafill vias to provide a substantially uniform average via density across a reticle field used to create a circuit based on the circuit design.

12. The system of claim 8, wherein the changer decreases the number of viafill vias to minimize gradients in via density between regions.

13. The system of claim 8, further comprising a selector for selecting the threshold via density based on a type of the coating deposited over the plurality of viafill vias.

14. A program product stored on a non-transitory computer-readable medium, which when executed by a computer system, performs a process comprising:

obtaining a circuit design including a plurality of viafill vias having differing via density across the circuit design, each viafill via interconnecting non-functional metal fill shapes in different layers of the circuit design;

selecting a region of the circuit design to evaluate using an evaluation window;

determining a via density within the evaluation window;

comparing the via density within the evaluation window with a threshold via density, the threshold via density being based upon a likelihood of a subsequent coating deposition resulting in a substantially planar surface; and decreasing a number of viafill vias within the region in the circuit design, or modifying a shape of one of the plurality of viafill vias, the decreasing or the modifying being performed in response to the via density being different than the threshold via density.

15. The program product of claim 14, wherein the decreasing of the number of viafill vias within the region is performed in response to the via density being greater than the threshold via density.

16. The program product of claim 14, wherein the non-functional metal fill shapes include one of: substantially rectangular shapes and wiring lines.

17. The program product of claim 14, wherein the decreasing of the number of viafill vias includes decreasing the number of viafill vias to provide a uniform average via density across a reticle field used to create a circuit based on the circuit design.

18. The program product of claim 14, wherein the decreasing of the number of viafill vias includes decreasing the number of viafill vias to minimize gradients in via density between regions.

19. The program product of claim 14, further comprising selecting the threshold via density based on a type of the coating deposited over the plurality of viafill vias.

20. The program product of claim 14, further comprising repeating the selecting, determining, comparing and decreasing across a plurality of regions of the circuit design.

* * * * *